United States Patent
Oka et al.

(10) Patent No.: US 10,814,309 B2
(45) Date of Patent: Oct. 27, 2020

(54) DENITRATION CATALYST AND DENITRATION DEVICE

(71) Applicant: MITSUBISHI HEAVY INDUSTRIES, LTD., Tokyo (JP)

(72) Inventors: Nobuki Oka, Tokyo (JP); Toshinobu Yasutake, Tokyo (JP); Noriko Watari, Tokyo (JP); Hidemasa Kakigami, Tokyo (JP); Syuji Fujii, Tokyo (JP); Akihiro Sawata, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 16/659,709

(22) Filed: Oct. 22, 2019

(65) Prior Publication Data
US 2020/0261889 A1 Aug. 20, 2020

(30) Foreign Application Priority Data
Feb. 20, 2019 (JP) ................................ 2019-028490

(51) Int. Cl.
*B01J 21/02* (2006.01)
*B01J 21/06* (2006.01)
(Continued)

(52) U.S. Cl.
CPC .......... *B01J 23/02* (2013.01); *B01D 53/9413* (2013.01); *B01J 21/02* (2013.01); *B01J 21/063* (2013.01); *B01J 23/18* (2013.01); *B01J 23/6447* (2013.01)

(58) Field of Classification Search
CPC . B01J 21/02; B01J 21/063; B01J 23/02; B01J 23/10; B01J 23/18; B01D 53/9413
See application file for complete search history.

(56) References Cited

U.S. PATENT DOCUMENTS 4,482,644 A * 11/1984 Beyerlein ............. C01B 13/185
  502/303
5,682,740 A * 11/1997 Kawamura ........ B01D 39/2082
  60/297

(Continued)

FOREIGN PATENT DOCUMENTS

| JP | 4611038 | 1/2011 |
| JP | 5812789 | 11/2015 |
| JP | 2017-192940 | 10/2017 |

OTHER PUBLICATIONS

Goto, Kazuya et al., "Direct Decomposition of NO into $N_2$ and $O_2$ over $Ba_3Y_{3.4}Sc_{0.6}O_9$", Applied Catalysis A: General 409-410 (Dec. 15, 2011), pp. 66-73.

*Primary Examiner* — Cam N. Nguyen
(74) *Attorney, Agent, or Firm* — Wenderoth, Lind & Ponack, L.L.P.

(57) ABSTRACT

A denitration catalyst for removing nitrogen oxide in an exhaust gas is represented by the following chemical formula: $Ba_3Y_{(4-x)}A_xO_9$, wherein A is an element selected from the group consisting of Bi, Sn, Ga, Mn, Ti, and Al; and X is 0.4 or more and 2 or less. A denitration device has the denitration catalyst for removing nitrogen oxide in an exhaust gas discharged from an exhaust gas generation source including a gas engine, a gas turbine, a melting furnace, or a boiler.

3 Claims, 3 Drawing Sheets

(51) Int. Cl.
*B01J 23/02* (2006.01)
*B01J 23/10* (2006.01)
*B01J 23/18* (2006.01)
*B01D 53/94* (2006.01)
*B01J 23/644* (2006.01)

(56) References Cited

U.S. PATENT DOCUMENTS 5,820,833 A * 10/1998 Kawamura ........ B01D 46/2411
422/174
5,906,959 A * 5/1999 Yamasita ............. B01D 53/945
502/327
5,910,466 A * 6/1999 Yamashita ............... B01J 23/58
423/221

* cited by examiner

DENITRATION CATALYST AND DENITRATION DEVICE

TECHNICAL FIELD

This disclosure relates to a denitration catalyst for removing nitrogen oxide (NOx) in exhaust gas.

BACKGROUND ART

Nitrogen oxide (NOx) contained in exhaust gas discharged from, for instance, an environmental plant, a thermal power plant, or an engine is a causative substance of photochemical oxidants and thus needs to be detoxified and discharged. Direct decomposition of NO using a catalyst (catalytic cracking) is expressed by the chemical equation: $2NO \rightarrow N_2+O_2$. This reaction is simple and can proceed thermodynamically. However, since nitrogen and oxygen are bonded together strongly, this reaction requires high temperature process (higher than 800° C.), the NO decomposition rate is low, and the catalytic performance easily decreases due to poisoning by oxygen. For these reasons, it has not been put to practical use. At present, as a highly active catalyst for direct decomposition of NO, a $Ba_3Y_4O_9$-based composite oxide catalyst (e.g., $Ba_3Y_{3.4}Sc_{0.6}O_9$) containing two components of Y (yttrium) and Ba (barium) is known, for instance (Non-Patent Document 1).

On the other hand, selective catalytic reduction (SCR) which promotes the decomposition reaction in a lower-temperature atmosphere (350° C.) by injecting a reducing agent such as ammonia has been put into practical use (Patent Documents 1 and 2, for instance). In this case, decomposition reaction of NOx is: $4NO+4NH_3+O_2 \rightarrow 4N_2+6H_2O$, $NO+NO_2+2NH_3 \rightarrow 2N_2+3H_2O$.

CITATION LIST

Patent Literature

Patent Document 1: JP4611038B
Patent Document 2: JP2017-192940A

Non-Patent Literature

Non-Patent Document 1: Goto, Kazuya et al., "Direct decomposition of NO into $N_2$ and $O_2$ over $Ba_3Y_{3.4}Sc_{0.6}O_9$", 2011, December 15, Applied Catalysis, A: General (2011), 409-410, p 66-73

SUMMARY

If at least a part of nitrogen oxide in exhaust gas discharged from a gas engine, a gas turbine, a boiler or the like can be removed by direct decomposition using a catalyst that enables the direct decomposition reaction ($2NO \rightarrow N_2+O_2$) at lower temperature, the amount of reducing agent to be injected can be reduced accordingly. $Ba_3Y_{3.4}Sc_{0.6}O_9$ disclosed in Non-Patent Document 1 is a catalyst ($Ba_3Y_4O_9$-based catalyst) in which Y (yttrium) sites are partially substituted with Sc (scandium). Such a catalyst in which Y-sites are partially substituted with another element is considered suitable.

In view of the above, an object of at least one embodiment of the present invention is to provide a $Ba_3Y_4O_9$-based catalyst suitable for removing nitrogen oxide in exhaust gas.

(1) A denitration catalyst according to at least one embodiment of the present invention is for removing nitrogen oxide in exhaust gas and represented by the following chemical formula: $Ba_3Y_{(4-x)}A_xO_9$, wherein A is an element selected from the group consisting of Bi, Sn, Ga, Mn, Ti, and Al.

With the above configuration (1), the denitration catalyst has a chemical formula of $Ba_3Y_{(4-x)}Bi_xO_9$, $Ba_3Y_{(4-x)}Sn_xO_9$, $Ba_3Y_{(4-x)}Ga_xO_9$, $Ba_3Y_{(4-x)}Mn_xO_9$, $Ba_3Y_{(4-x)}Ti_xO_9$, or $Ba_3Y_{(4-x)}Al_xO_9$. Thus, it is possible to provide a catalyst enabling direct decomposition of NO ($2NO \rightarrow N_2+O_2$) in exhaust gas at lower temperature without high temperature process at 800° C. or higher, and suitable for removing nitrogen oxide (NOx).

(2) In some embodiments, in the above configuration (1), A in the chemical formula is Bi, Ti, or Al.

With the above configuration (2), the denitration catalyst has a chemical formula of $Ba_3Y_{(4-x)}Bi_xO_9$, $Ba_3Y_{(4-x)}Ti_xO_9$, or $Ba_3Y_{(4-x)}Al_xO_9$. These catalysts are experimentally confirmed that the yield (reaction rate) of $N_2$ produced by direct decomposition of NO at a predetermined reaction temperature (e.g., 700° C. or 850° C.) is higher than that of $Ba_3Y_{3.6}Sc_{0.4}O_9$ conventionally known. Thus, it is possible to provide a denitration catalyst having a higher nitrogen oxide removal performance.

(3) In some embodiments, in the above configuration (1) or (2), X in the chemical formula is 0.4 or more and 2 or less.

With the above configuration (3), X in the chemical formula of $Ba_3Y_{(4-x)}A_xO_9$ is in a range of $0.4 \leq X \leq 2$. When X is in this range, the nitrogen oxide removal performance is expected to be higher than when X is out of this range. Thus, it is possible to provide a denitration catalyst having a high nitrogen oxide removal performance.

(4) A denitration device according to at least one embodiment of the present invention comprises: the denitration catalyst described in any one of the above (1) to (3) for removing nitrogen oxide in exhaust gas discharged from an exhaust gas generation source including a gas engine, a gas turbine, a melting furnace, or a boiler.

With the above configuration (4), the denitration device removes nitrogen oxide in exhaust gas discharged from an exhaust gas generation source including a gas engine, a gas turbine, a melting furnace, or a boiler. Thus, by removing at least a part of nitrogen oxide in exhaust gas discharged from the exhaust gas generation source by direct decomposition, it is possible to reduce or eliminate the use of reducing agent such as ammonia. For instance, if the use of reducing agent for denitration is unnecessary, equipment for supplying the reducing agent to the denitration device becomes unnecessary. As a result, it is possible to reduce not only the operation cost but also the initial cost of the plant.

At least one embodiment of the present invention provides a $Ba_3Y_4O_9$-based catalyst suitable for removing nitrogen oxide in exhaust gas.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
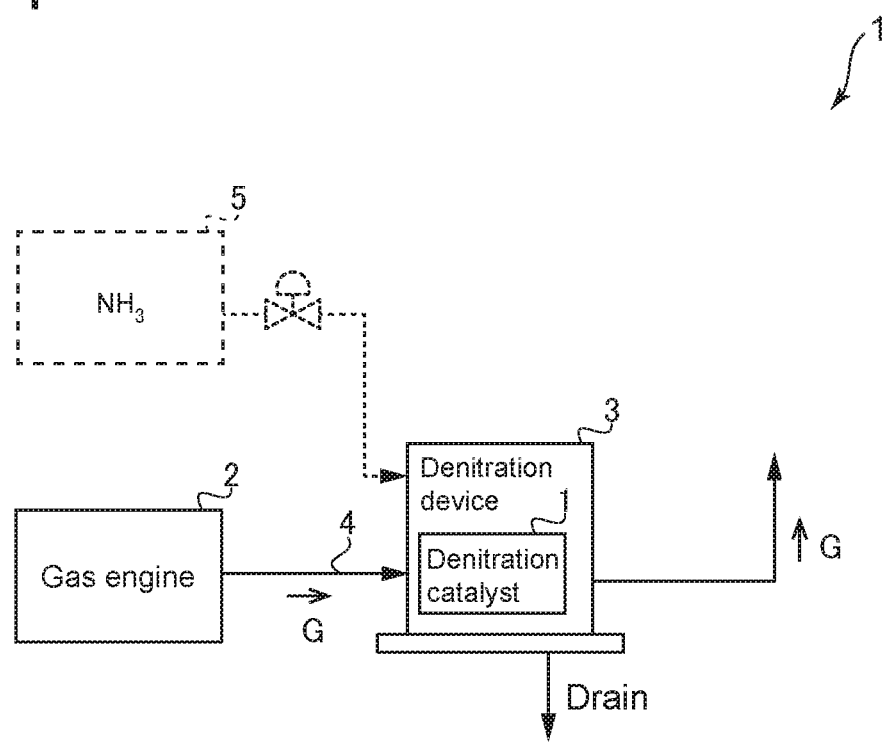
FIG. 1 is a diagram of a denitration device including a denitration catalyst according to an embodiment of the present invention.

FIG. 1 is a diagram of a denitration device 3 including a denitration catalyst 1 according to an embodiment of the present invention. The denitration catalyst 1 is a catalyst for removing nitrogen oxide (NOx) contained in exhaust gas G discharged from an exhaust gas generation source 2. As shown in FIG. 1, the denitration catalyst 1 is disposed inside the denitration device 3. Further, the denitration device 3 and the exhaust gas generation source 2 are connected by a pipe 4 or the like so that exhaust gas G discharged from the exhaust gas generation source 2 flows through an exhaust gas passage formed in the pipe 4 into the denitration catalyst 1 inside the denitration device 3. In the embodiment shown in FIG. 1, the exhaust gas generation source 2 is a gas engine (reciprocating engine) using gas as a fuel. The gas engine is configured to convert energy into rotational motion by combusting the gas fuel and rotate a generator (not shown) to generate power. Exhaust gas G from which nitrogen oxide is removed by the denitration device 3 may be further treated by another exhaust gas treatment device. Then, exhaust gas G is discharged through a stack (not shown) to the atmosphere. However, the present invention is not limited to this embodiment. The exhaust gas generation source 2 may be, for instance, a gas turbine, a melting furnace, or a boiler.

The denitration catalyst 1 directly decomposes (catalytically cracks) nitrogen oxide in exhaust gas G into nitrogen ($N_2$) and oxygen ($O_2$) and thereby removes nitrogen oxide from exhaust gas G. The denitration catalyst 1 may have a honeycomb structure (honeycomb catalyst) or other structures such as a plate-like structure (plate catalyst). The denitration device 3 in the embodiment shown in FIG. 1 is configured to remove nitrogen oxide contained in exhaust gas of a gas engine without supplying a reducing agent such as ammonia. In other embodiments, the denitration device 3 may be configured to be supplied with a reducing agent such as ammonia stored in a tank 5. In this case, an injector nozzle (not shown) may be disposed upstream of the denitration catalyst 1 in the exhaust gas passage to supply the reducing agent to the denitration catalyst 1.

The denitration catalyst 1 used as descried above has a chemical formula of $Ba_3Y_{(4-x)}A_xO_9$. In the chemical formula, A is an element selected from the group consisting of Bi (bismuth), Sn (tin), Ga (gallium), Mn (manganese), Ti (titanium), and Al (aluminum). In other words, the denitration catalyst 1 has a chemical formula in which Y (yttrium) sites are partially substituted with any of the six elements. In the chemical formula, X is mole ratio of the element represented by A.

Figure 2:
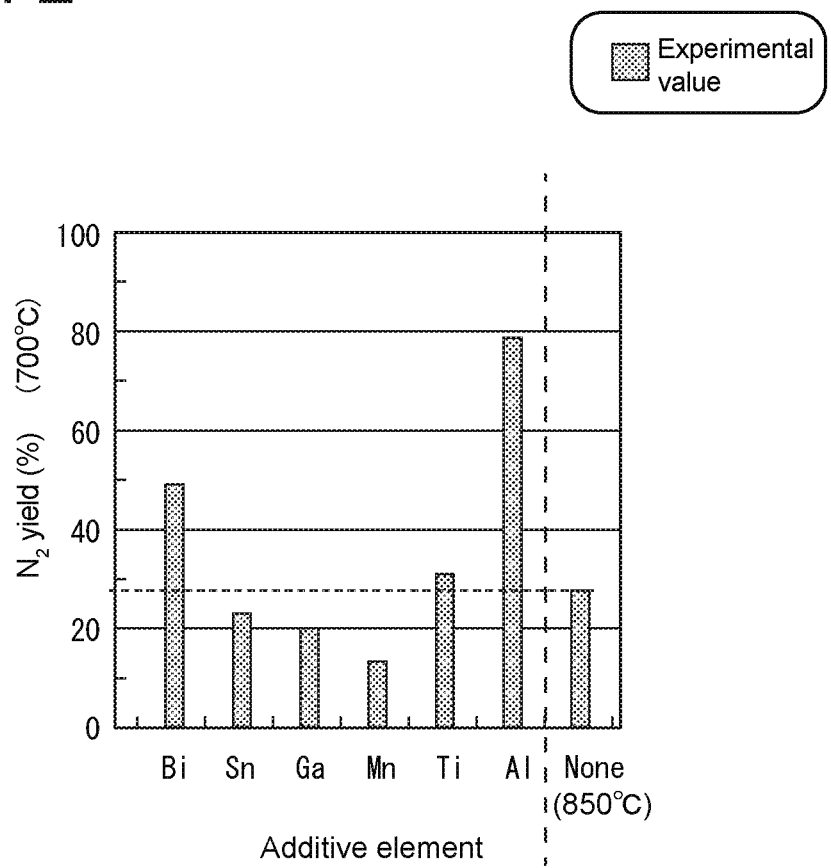
FIG. 2 is a diagram showing experimental values of catalytic performance at 700° C. of multiple catalytic substances having different additive elements according to an embodiment of the present invention.

FIG. 2 is a diagram showing experimental values of catalytic performance at 700° C. of multiple catalytic substances ($Ba_3Y_{3.6}A_{0.4}O_9$) having different additive elements. In other words, the graph of FIG. 2 corresponds to the case where X (mol %) of $Ba_3Y_{(4-x)}A_xO_9$ is 0.4 (X=0.4). The vertical axis of FIG. 2 is $N_2$ yield (%), which corresponds to the catalytic performance. The horizontal axis of FIG. 2 shows catalysts in which the above-described element is substituted for A (A=Bi, Sn, Ga, Mn, Ti, or Al) in $Ba_3Y_{3.6}A_{0.4}O_9$, and a catalyst containing no additive element (no partial substitution) as expressed by "None" in the figure. The figure shows only an additive element substituted for A as a representative.

From experimental results shown in FIG. 2, it was revealed that, among the catalytic substances with any of the six elements, three catalytic substances containing Bi, Ti, and Al as the additive element have a higher catalytic performance than the catalytic substance containing no additive element. Further, it was revealed that the catalytic performance is higher in the order of the catalytic substances containing Al, Bi, and Ti as the additive element, and the catalytic substances containing Al and Bi as the additive element have a particularly high catalytic performance.

Moreover, direct NO decomposition rate using $Ba_3Y_{3.6}Bi_{0.4}O_9$ as a catalyst was 76% or more at a temperature of exhaust gas (reaction temperature at denitration) of 700° C. This indicates that when $NH_3$ usage in a desulfurization device using SCR of a conventional gas engine is 1, $NH_3$ usage is reduced by 76% or more. When the direct decomposition rate is increased to this extent, it is possible to provide the denitration device 3 that does not require supply of the reducing agent to the denitration catalyst 1 (see FIG. 1). Further, since the catalytic performance of $Ba_3Y_{(4-x)}Al_xO_9$ (X=0.4) was higher than the case where the additive element is Bi, a further reduction in $NH_3$ usage can be expected. Thus, when the use of reducing agent for denitration is unnecessary, equipment for supplying the reducing agent to the denitration device becomes unnecessary. As a result, it is possible to reduce not only the operation cost but also the initial cost of the plant.

Figure 3:
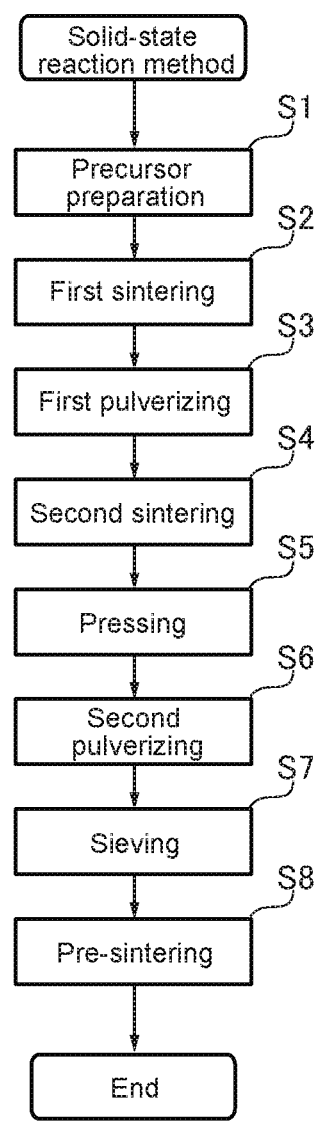
FIG. 3 is a flowchart of a solid-state reaction method according to an embodiment of the present invention.

The experimental values shown in FIG. 2 were obtained by the present inventors by preparing catalytic substances (X=0.4) with Bi, Sn, Ga, Mn, Ti, or Al, and $Ba_3Y_4O_9$ as is with no additive element, i.e., seven catalytic substances in total, and performing denitration using these substances as the denitration catalysts 1. The preparation of these denitration catalysts 1 may be performed by a known method, such as a solid-state reaction method. In this embodiment, the denitration catalysts 1 other than the one with Sn were prepared by a solid-state reaction method as shown in FIG. 3 described later. $Ba_3Y_{3.6}Sn_{0.4}O_9$ was prepared by a mechanochemical method, which is a method using a highly reactive material to facilitate the formation of a crystal phase, since reaction using the solid-state reaction method under a later-described condition hardly proceeds. Then, each of the resulting powdered catalytic substances was caused to react with a test gas containing nitrogen oxide, and $N_2$ yield was measured by a gas chromatography mass analysis method.

FIG. 3 is a flowchart of a solid-state reaction method according to an embodiment of the present invention. As shown in FIG. 3, the solid-state reaction method includes the steps of: precursor preparation (S1); sintering (S2); pulverizing (S3); sintering (S4); pressing (S5); pulverizing (S6); sieving (S7); and pre-sintering (S8). Further, the composition of the catalytic substance thus prepared was analyzed by X-ray diffraction to check whether Y-sites of $Ba_3Y_4O_9$ are partially substituted with the above-described element.

With the above configuration, the denitration catalyst 1 has a chemical formula of $Ba_3Y_{(4-x)}Bi_xO_9$, $Ba_3Y_{(4-x)}Sn_xO_9$, $Ba_3Y_{(4-x)}Ga_xO_9$, $Ba_3Y_{(4-x)}Mn_xO_9$, $Ba_3Y_{(4-x)}Ti_xO_9$, or $Ba_3Y_{(4-x)}Al_xO_9$. Thus, it is possible to provide a catalyst enabling direct decomposition of NO ($2NO \rightarrow N_2+O_2$) in exhaust gas at lower temperature without high temperature process at 800° C. or higher, and suitable for removing nitrogen oxide (NOx).

Although the denitration catalyst 1 in the embodiment shown in FIG. 2 is based on $Ba_3Y_{3.6}A_{0.4}O_9$, in other embodiments, X in the chemical formula $Ba_3Y_{(4-x)}A_xO_9$ may be 0.4 or more and 2 or less. For instance, in the case where the substitution element of Y-sites is Sc (scandium), it is known that $N_2$ yield increases steeply until Sc substitution ratio for Y-sites reaches 10 mol % approximately (X=0.4 approximately), has a peak when Sc substitution ratio is 15 mol % approximately (X=0.6 approximately), is kept at 90% or more until 50 mol % approximately (X=2 approximately), and then decreases gently (see Non-Patent Document 1).

The tendency of change in $N_2$ yield with X value is considered to be the same even if the substitution element is other than Sc. Therefore, when X in the chemical formula $Ba_3Y_{(4-x)}A_xO_9$ satisfies $0.4 \leq X \leq 2$, it is possible to provide a denitration catalyst having a high nitrogen oxide removal performance.

Example 1

Details of the steps of the solid-state reaction method used for obtaining the above-described experimental values of $N_2$ yield will be specifically described with the flowchart of FIG. 3. In the precursor preparation step of step S1 of FIG. 3, a precursor was prepared by evaporating a mixed aqueous solution of $Ba(CH_3COO)_2$, $Y(NO_3)_3 \cdot 6H_2O$, and $Sc_2O_3$. In the sintering (first sintering) step of step S2, sintering was performed at 673K for 2 hours in the atmosphere. After the pulverizing (first pulverizing) step of step S3, in the sintering (second sintering) step of step S4, sintering was performed at 1473K (400° C.) for 6 hours in the atmosphere. In the pressing step of step S5, the catalyst powder obtained by steps S1 to S4 was pressed into a disk shape. In the pulverizing (second pulverizing) step of step S6, the disk was pulverized to about 0.5 to 1.5 mm. The sieving step of step S7 was performed with a mesh size of 16 to 32. In the pre-sintering step of step S8, pre-sintering was performed at 1123 K (850° C.) for several hours in a He atmosphere. Then, after carbonate was removed from the surface of the catalytic substance, $N_2$ yield was measured by the gas chromatography mass analysis method.

Example 2

The preparation by the mechanochemical method was performed by requesting Hokko Chemical Industry Co., Ltd. For instance, $Ba_3Y_{3.6}Sn_{0.4}O_9$ can be prepared by a method of producing composite oxide powder disclosed in JP5462639B.

The present invention is not limited to the embodiments described above, but includes modifications to the embodiments described above, and embodiments composed of combinations of those embodiments.

The invention claimed is:

1. A denitration catalyst for removing nitrogen oxide in an exhaust gas, represented by the following chemical formula:

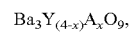

$Ba_3Y_{(4-x)}A_xO_9$, wherein A is an element selected from the group consisting of Bi, Sn, Ga, Mn, Ti, and Al and X is 0.4 or more and 2 or less.

2. The denitration catalyst according to claim 1, wherein A in the chemical formula is Bi, Ti, or Al.

3. A denitration device comprising the denitration catalyst according to claim 1 for removing nitrogen oxide in an exhaust gas discharged from an exhaust gas generation source including a gas engine, a gas turbine, a melting furnace, or a boiler.

* * * * *